United States Patent
Lee et al.

(10) Patent No.: US 7,079,854 B2
(45) Date of Patent: Jul. 18, 2006

(54) PACKET SERVICE SYSTEM AND METHOD FOR CONTROLLING PACKET TRANSMISSION

(75) Inventors: So-Young Lee, Gyeonggi-Do (KR); Seung-June Yi, Seoul (KR); Young-dae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 194 days.

(21) Appl. No.: 10/755,933

(22) Filed: Jan. 12, 2004

(65) Prior Publication Data

US 2004/0160938 A1 Aug. 19, 2004

(30) Foreign Application Priority Data

Jan. 11, 2003 (KR) .................. 10-2003-0001875
Jul. 10, 2003 (JP) .................. 10-2003-0046943

(51) Int. Cl.
*H04Q 7/20* (2006.01)
(52) U.S. Cl. .................. 455/466; 455/517; 455/39; 370/230; 370/465
(58) Field of Classification Search ............... 455/466, 455/452.1, 452.2, 517, 524, 528, 550.1, 67.11, 455/39; 370/230, 253, 465
See application file for complete search history.

(56) References Cited

U.S. PATENT DOCUMENTS 6,374,112 B1* 4/2002 Widegren et al. ......... 455/452.2
2003/0092392 A1* 5/2003 Komandur et al. ......... 455/67.1

FOREIGN PATENT DOCUMENTS

EP          1 241 837 A1   9/2002
WO       WO 02/52859 A1   7/2002

OTHER PUBLICATIONS

3GPP: "3rd Generation Partnership Project; Technical Specification Group Services and System Aspects; Quality of Service (QoS) concept and architecture (Release 5)" 3GPP TS 23.107 V5.7.0, (Dec. 2002).

* cited by examiner

*Primary Examiner*—Melur Ramakrishnaiah
(74) *Attorney, Agent, or Firm*—Lee, Hong, Degerman, Kang & Schmadeka, P.C.

(57) ABSTRACT

A method of data communication comprising establishing a communication bearer between a data source and a mobile device over a communication network comprising wired and wireless communication segments; and adjusting transmission of the real-time data based on quality of service over the wired and wireless communication segments, when data being communicated comprises real-time data and is being transmitted over a real-time communication protocol.

27 Claims, 5 Drawing Sheets

PACKET SERVICE SYSTEM AND METHOD FOR CONTROLLING PACKET TRANSMISSION

CROSS REFERENCE TO RELATED APPLICATIONS

Pursuant to 35 U.S.C. § 119(a), this application claims the benefit of earlier filing date and right of priority to Korean Patent Application Nos. 2003-01875 and 2003-46943, both filed on Jan. 11, 2003 and Jul. 10, 2003, the content of which is hereby incorporated by reference herein in its entirety.

BACKGROUND OF THE INVENTION

1. Field of the Invention

The present invention relates to a communication system, and more particularly, to a packet service system and method of controlling packet transmission.

2. Discussion of the Related Art

A universal mobile telecommunications system (UMTS) is a third generation mobile communication system that has evolved from a standard known as Global System for Mobile communications (GSM). This standard is a European standard which aims to provide an improved mobile communication service based on a GSM core network 300 and wideband code division multiple access (W-CDMA) technology.

FIG. 1 shows a network structure of a general UMTS. As shown in FIG. 1, the UMTS is roughly divided into a terminal 100, a UTRAN 200 and a core network 300. The UTRAN 200 includes one or more radio network subsystems (RNS). Each RNS includes a radio network control (RNC) and one or more Nodes B managed by the RNCs.

Nodes B are managed by the RNCs, receive information sent by the physical layer of a terminal 100 (e.g., mobile station, user equipment and/or subscriber unit) through an uplink, and transmit data to a terminal 100 through a downlink. Nodes B, thus, operate as access points of the UTRAN 200 for terminal 100.

The RNCs perform functions which include assigning and managing radio resources, and operate as an access point with respect to the core network 300. A primary function of UTRAN 200 is constructing and maintaining a radio access bearer (RAB) for a call connection between the terminal 100 and the core network 300. The core network 300 applies quality of service (QoS) requirements of end-to-end to the RAB, and accordingly, UTRAN 200 can satisfy the QoS requirements of the end-to-end by constructing and maintaining the RAB.

The RAB service is divided into an Iu bearer service and a radio bearer service. The Iu bearer service handles reliable user data transmission between boundary nodes of UTRAN 200 and the core network 300, while the radio bearer service handles reliable user data transmission between the terminal 100 and UTRAN 200.

FIG. 2 illustrates a radio protocol between the terminal 100 and UTRAN 200 on the basis of the 3GPP wireless access network standards. With reference to FIG. 2, the radio protocol is vertically formed of a physical layer, a data link layer and a network layer, and is horizontally divided into a user plane for transmitting data information and a control plane for transmitting a control signal.

The user plane is a region to which traffic information of a user, such as voice or an IP packet, is transmitted. The control plane is a region to which control information, such as an interface of a network or maintenance and management of a call, is transmitted. In FIG. 2, protocol layers can be divided into a first layer (L1), a second layer (L2) and a third layer (L3) based on three lower layers of an open system interconnection (OSI) standard model well known in a communication system.

The first layer (PHY) provides an information transfer service to the upper layer by using various radio transfer techniques. The first layer is connected to the MAC layer through a transport channel, and data is transferred between the MAC layer and the PHY layer through the transport channel. The MAC layer provides a re-allocation service of the MAC parameter for allocation and re-allocation of radio resources.

The MAC layer is connected to the radio link control (RLC) layer through a logical channel, and various logical channels are provided according to the kind of transmitted information. In general, when information of the control plane is transmitted, a control channel is used. When information of the user plane is transmitted, a traffic channel is used.

The MAC is classified into an MAC-b sublayer, an MAC-d sublayer and an MAC-c/sh sublayer according to types of managed transport channels. The MAC-b sublayer manages a BCH (Broadcast Channel) handling broadcast of system information, while the MAC-c/sh sublayer manages shared transport channel such as FACH (Forward Access Channel), DSCH (Downlink Shared Channel), or the like, shared with other terminal 100s.

In UTRAN 200, the MAC-c/sh sublayer is positioned at a control RNC (CRNC) and manages channels shared by every terminal 100 in a cell, so that one MAC-c/sh sublayer exists in each cell. The MAC-d sublayer manages a DCH (Dedicated Channel), a dedicated transport channel for a specific terminal 100. Accordingly, the MAC-d sublayer is positioned at a serving RNC (SRNC) managing a corresponding terminal 100, and one MAC-d sublayer exists also at each terminal 100.

A radio link control (RLC) layer supports a reliable data transmission and may perform a function of segmentation and concatenation of an RLC service data unit (SDU) coming from a higher layer. The RLC SDU transferred from the higher layer is adjusted in its size according to a throughput capacity at the RLC layer, to which header information is added, and then transferred in a form of a PDU (Protocol Data Unit) to the MAC layer. The RLC layer includes an RLC buffer for storing the RLC SDU or the RLC PDU coming from the higher layer.

A broadcast/multicast control (BMC) layer performs functions of scheduling a cell broadcast message (CB) transferred from the core network 300 and broadcasting the CB to UEs positioned in a specific cell(s). At the side of UTRAN 200, the CB message transferred from the upper layer is combined with information, such as a message ID, a serial number or a coding scheme, and transferred in a form of BMC message to the RLC layer and to the MAC layer through a CTCH (Common Traffic Channel), a logical channel. In this case, the logical channel CTCH is mapped to a FACH (Forward Access Channel), a transport channel, and an S-CCPCH (Secondary Common Control Physical Channel), which is a physical channel.

Referring to FIG. 2, a packet data convergence protocol (PDCP) layer is an upper layer of the RLC layer, allowing data to be transmitted effectively on a radio interface with a relatively small bandwidth through a network protocol such as the IPv4 or the IPv6. For this purpose, the PDCP layer performs a function of reducing unnecessary control information, which is called a header compression, and in this respect, RFC2507 and RFC3095 (robust header compression: ROHC), a header compression technique defined by an Internet standardization group called an IETF (Internet Engineering Task Force), can be used. In these methods, because the only information requisite for the header part of a data is transmitted, control information is transmitted, so that an amount of data transmission can be reduced.

The RRC layer positioned in the lowest portion of the third layer (L3) is defined only in the control plane and controls the logical channels, the transport channels, and the physical channels in relation to the setup, the reconfiguration, and the release of the RBs. The RB signifies a service provided by the second layer for data transmission between the terminal 100 and UTRAN 200, and setting up the RB means processes of stipulating the characteristics of a protocol layer and a channel, which are required for providing a specific service, and setting the respective detailed parameters and operation methods.

In order to broadcast or multicast the multimedia data to a specific terminal 100 group wirelessly, a new service called a multimedia broadcast/multicast service (MBMS) has been proposed. The MBMS is a service for transmitting multimedia data such as audio, video or image data to plural terminal 100s by using a uni-directional point-to-multipoint bearer service. The MBMS is divided into a broadcast mode and a multicast mode. That is, the MBMS is divided into an MBMS broadcast service and an MBMS multicast service.

The MBMS broadcast mode is a service for transmitting multimedia data to every user in a broadcast area. The broadcast area means a broadcast service available area. One or more broadcast areas may exist in one PLMN. One or more broadcast services can be provided in one broadcast area. And one broadcast service can be provided to several broadcast areas.

The MBMS multicast mode is a service for transmitting multimedia data only to a specific user group existing in a multicast area. The multicast area means a multicast service available area. One or more multicast areas can exist in one PLMN, one or more multicast services can be provided in one multicast area, and one multicast service can be provided to several multicast areas.

In the multicast mode, a user is requested to join a multicast group to receive a specific multicast service. At this time, the multicast group refers to a user group that receives the specific multicast service, and joining refers to a behavior of being admitted to the multicast group intending for receiving the specific multicast service. An MBMS RAB, a radio access bearer (RAB) for the MBMS, is configured for guaranteeing a specific level of QoS.

The MBMS serves packet transmission having real-time characteristics. Therefore, the MBMS uses a real-time transport protocol (hereinafter abbreviated RTP), which provides end-to-end delivery services for data with real-time characteristics, such as interactive audio and video real-time packet transmission. A RTP control protocol (hereinafter abbreviated RTCP) playing a role of real-time packet transmission control using the packet loss information is used because RTP itself does not provide any mechanism to ensure timely delivery or provide other quality-of-service guarantees.

The RTP and RTCP were originally developed for wired networks (i.e. Internet) and end-to-end corresponds to one data source and one final destination. The data source transmits the RTP packets to the UE through the radio and wired section. Here, radio section means the air interface from UTRAN 200 to UE, and wired section means the non-air interface from UTRAN 200 to data source via CN.

Then, the UE transmits the RTCP packets having the packet loss information to the data source for the control of next RTP packet transmission.

The data source receives the RTCP packet and determines the next RTP packet transmission rate, size or encoding scheme based on the amount of packet loss during the RTP packet transmission. The data source having no way of determining loss in the radio section, considers the packet loss as collision in the wired section.

The UMTS system, however, consists of radio and wired sections and, moreover, the amount of packet loss in radio section is greater than the amount of packet loss in the wired section. When the packet loss only occurs in radio section, the data source cannot accurately determine where the packet loss happens and therefore presume that the loss is result of a collision in the wired section.

The packet loss occurring in radio or wired sections affect the determination of next RTP packet transmission rate, size, or encoding scheme. In the related art, there is no way for the data source to determine the cause for packet loss because the UE receives the RTP packets and calculates the amount of packet loss and transmits the RTCP packet including that information.

Further, in MBMS, a plurality of UEs receive the RTP packet of a MBMS service and the RTCP packets are transmitted to the data source from the respective UEs. The RTCP packet transmission from the plurality of UE to the data source happens simultaneously occupying radio resources and results in a problem of determining the bandwidth required for RTP and RTCP packet transmission.

Specifically, since RTP and RTCP are protocols based on the wired section, the usage of RTP and RTCP in point-to-multipoint communications as MBMS without modification results in inefficient control of packet transmission and errors in assigning the proper bandwidth required for the packet transmission.

SUMMARY OF THE INVENTION

A method of transferring real-time data from a data source to a mobile device in communication with a communications network having a wired section and a radio section is provided. The method comprises receiving the real-time data from the data source over the wired section; determining packet loss over the wired section to produce control information in the UMTS terrestrial radio access network (UTRAN 200); transmitting the control information to the data source from the UTRAN 200 for adjusting the transmission rate, transmission size, or encoding scheme of the real-time packets that are transmitted to the UTRAN 200 from the data source; and transmitting the real-time data to the mobile device over the radio section from the UTRAN 200. The real-time data is communicated by a real-time transport protocol (RTP). And the control information is transmitted by a RTP control protocol (RTCP).

Another method of transferring real-time data from a data source to a mobile device in communication with a communications network having a wired section and a radio section comprises receiving the real-time data from the UTRAN 200, determining packet loss over the radio section to produce control information in the mobile device; and transmitting the control information to the UTRAN 200 from the mobile device for adjusting the transmission rate, transmission size, or encoding scheme of the real-time packets that transmitted to the mobile device from the UTRAN 200. The real-time data is transmitted by a real-time transport protocol (RTP). And the control information is transmitted by a RTP control protocol (RTCP).

Another method of transferring real-time data from a data source to a mobile device in communication with a communications network having a wired section and a radio section comprises receiving the real-time data from the data source over the wired section, transmitting the real-time data to the mobile device over the radio section from the UTRAN 200, receiving the control information based on the packet loss over the radio section, determining packet loss over the wired section, combining the control information with the packet loss over the wired section and the packet loss over the radio section, and transmitting the control information to the data source from the radio access network for adjusting the transmission rate, transmission size, or encoding scheme of the real-time packets that transmitted to the mobile device from the data source. The real-time data is received and transmitted over a real-time transport protocol (RTP). And the control information is transmitted by a RTP control protocol (RTCP).

In one embodiment, the UTRAN 200 comprises a relay, function module for translating the real-time data received over the wired section to detect the amount of packet loss. The relay function module sends the received real-time data to the mobile device over the radio section. The relay function module sends the control information comprising the packet loss information to the data source. The real-time data is encapsulated in real-time transport protocol (RTP) packets transmitted over User Data gram Protocol (UDP)/Internet Protocol (IP). The control information is encapsulated in RTP Control Protocol (RTCP).

In yet another embodiment, a method of data communication comprises establishing a radio access bearer between a core network 300 and a mobile device over a communication network; and configuring the relay function module when the real-time data is transmitted by a real-time protocol (RTP) and is determined to use the RTP control protocol (RTCP).

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

Reference will now be made in detail to the preferred embodiments of the present invention, examples of which are illustrated in the accompanying drawings. Wherever possible, the same reference numbers will be used throughout the drawings to refer to the same or like parts.

DETAILED DESCRIPTION OF PREFERRED EMBODIMENTS

Figure 1:
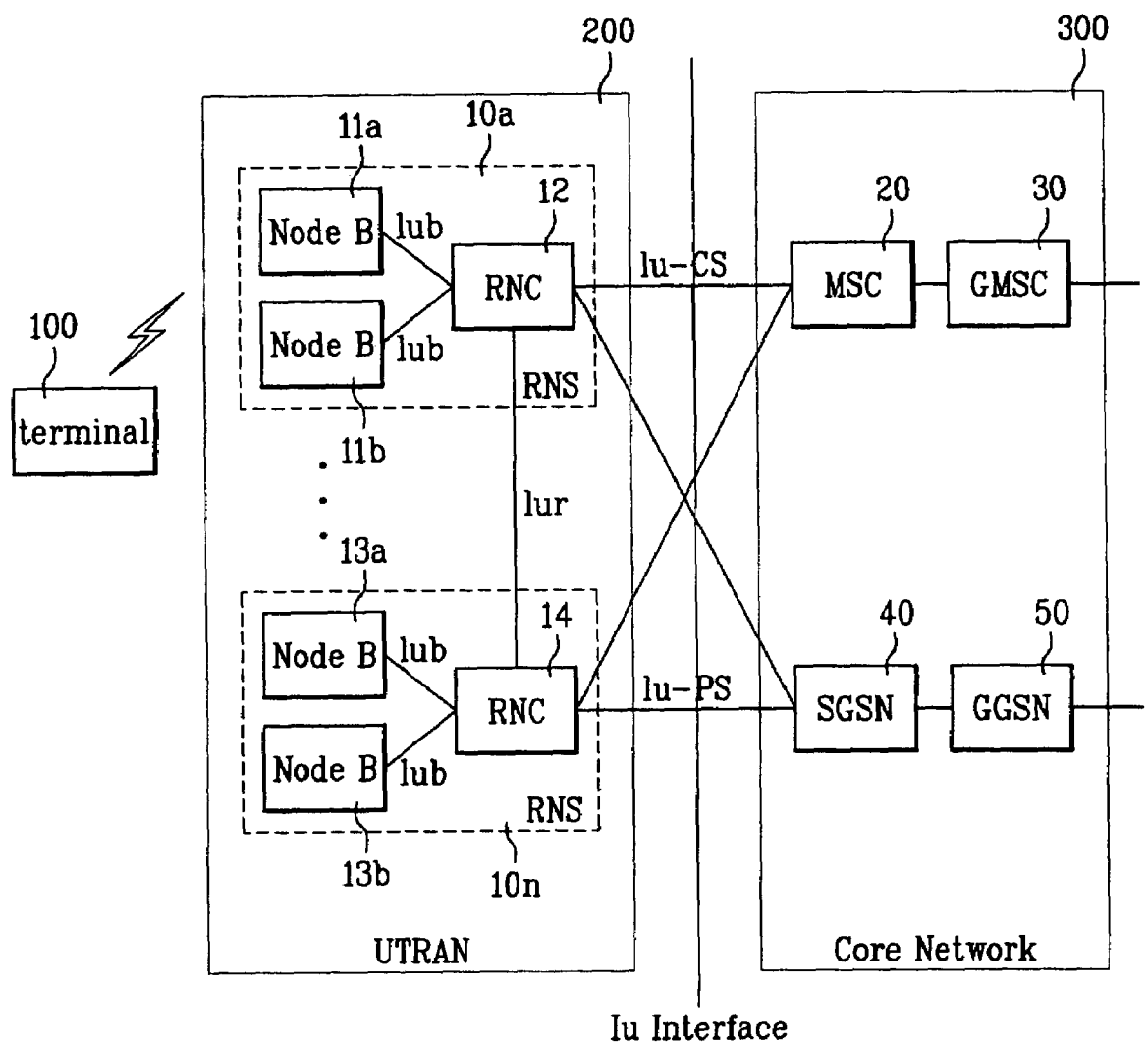
FIG. 1 is a block diagram of architecture of a general UMTS.
Figure 2:
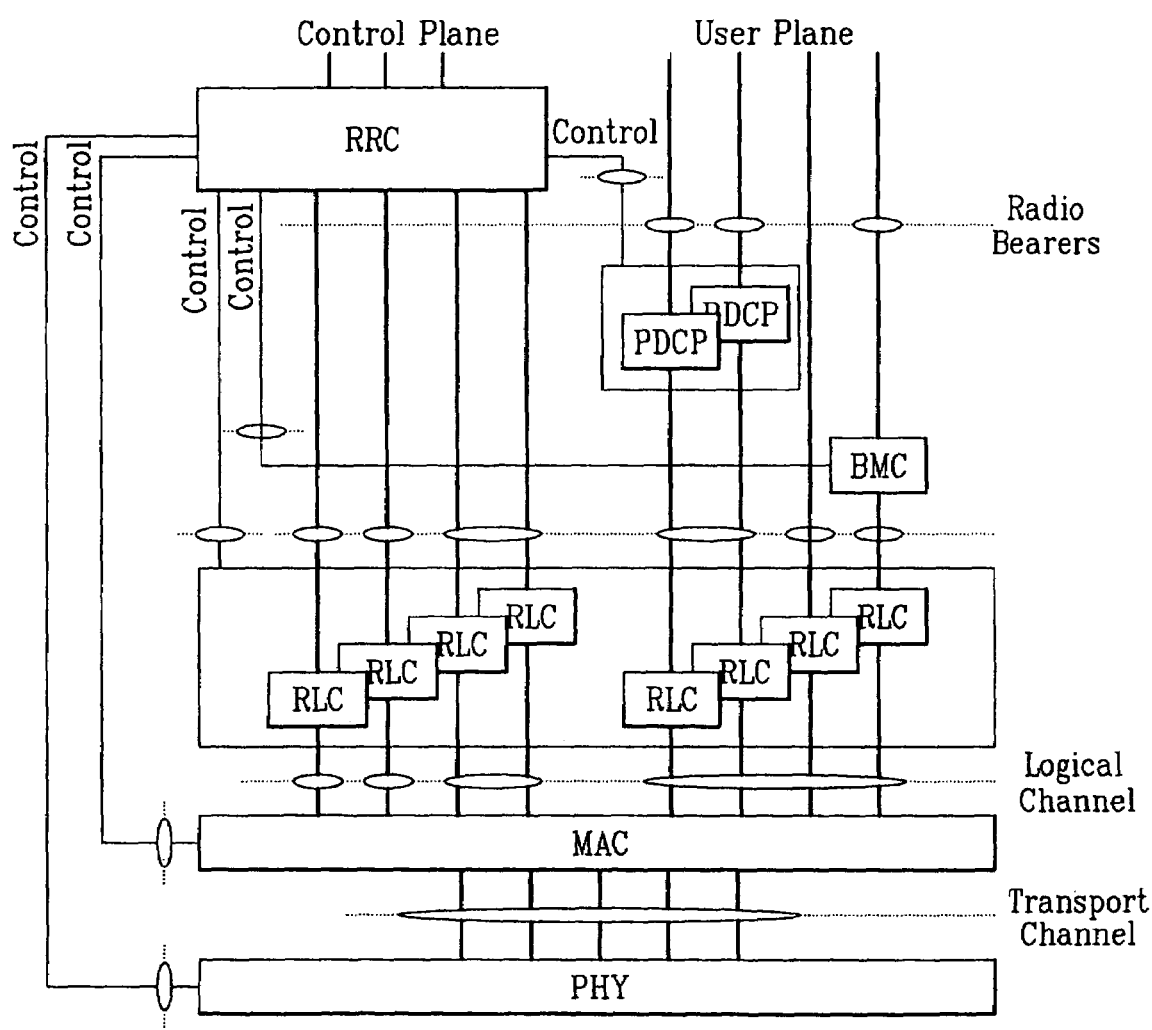
FIG. 2 is a diagram of Radio Interface protocol architecture between user equipment and UTRAN 200 based on 3GPP radio access network specifications.
Figure 3:
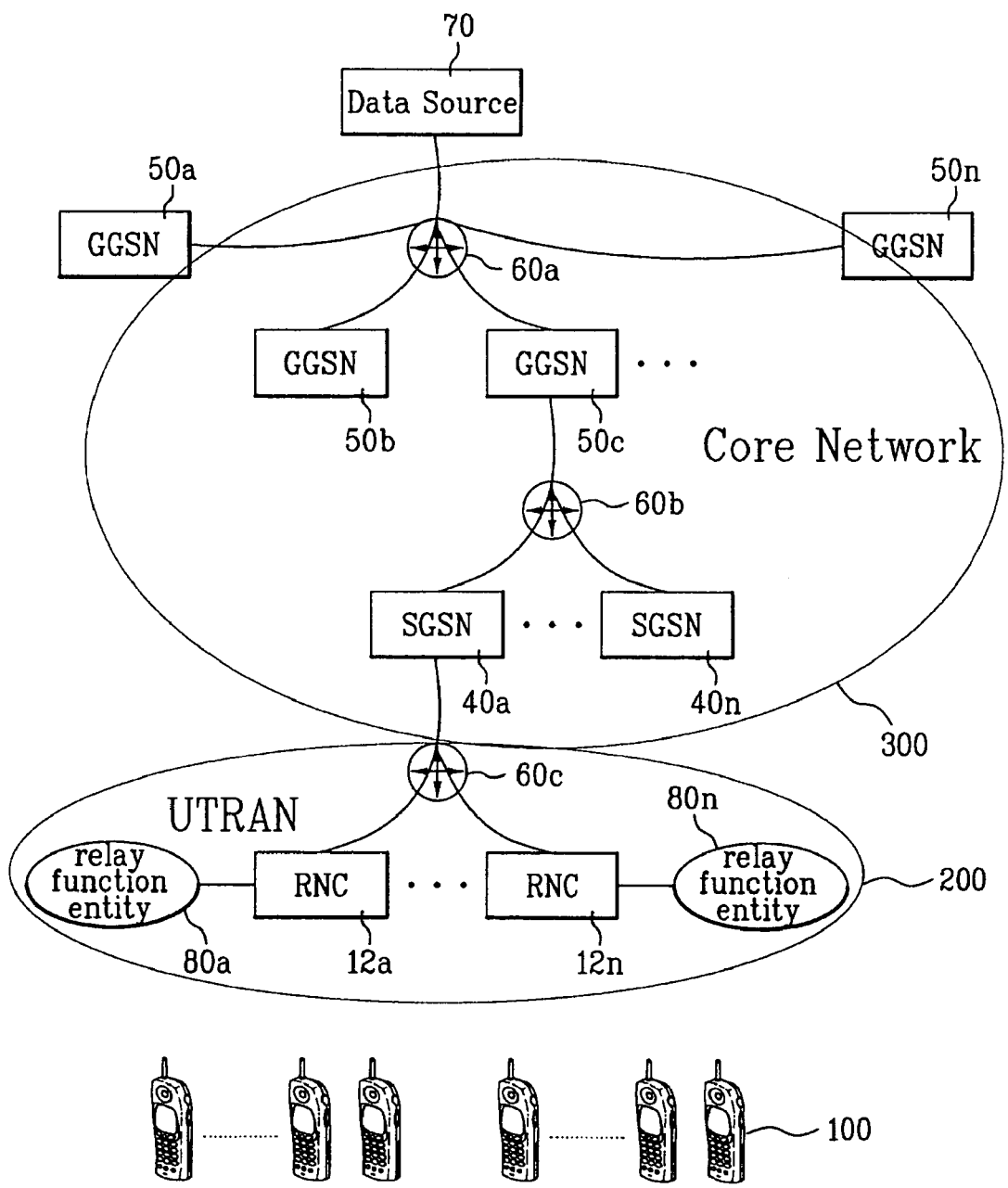
FIG. 3 is a diagram of UMTS for explaining real-time/non-real-time packet flow according to one embodiment of the present invention.

Referring to FIG. 3, a packet service system according to the present invention comprises a data source, a core network 300, a UTRAN 200, and a user equipment (UE). The data source is the beginning point of a wired section, the UTRAN 200 is the end point of a wired section as well as the beginning point of a radio section, and the user equipment is the end point of a radio section.

The data source and the user equipment are equipped with protocol layers for real-time packet services. For example, the data source downwardly contains an RTP layer and an RTCP layer and further contains a UDP/IP (user datagram protocol/Internet protocol) layer below the RTP/RTCP layers. The user equipment contains the above-mentioned protocol layers of the data source as well.

In one embodiment, the present invention is characterized in that UTRAN 200 comprises RTP and RTCP layers over UDP/IP layer to support real-time packet services more efficiently. That is, when the packet has real time characteristics and the data source uses the RTP control protocol (RTCP), the UTRAN 200 translates the packets. On the other hand, when the packet has non-real time characteristics, the UTRAN 200 transparently delivers the packets.

The relay function module of UTRAN 200 relays the RTP packets received from the data source to UE by the RTP layer, produces the control information based on the amount of packet loss by the RTCP layer and transmits the control information to the data source. The UTRAN 200 further comprises a UDP/IP (user datagram protocol/Internet protocol) layer below the RTP/RTCP layers. The real-time data is communicated between the data source and UTRAN 200 or between UE and UTRAN 200 is RTP/UDP/IP packet.

Figure 4:
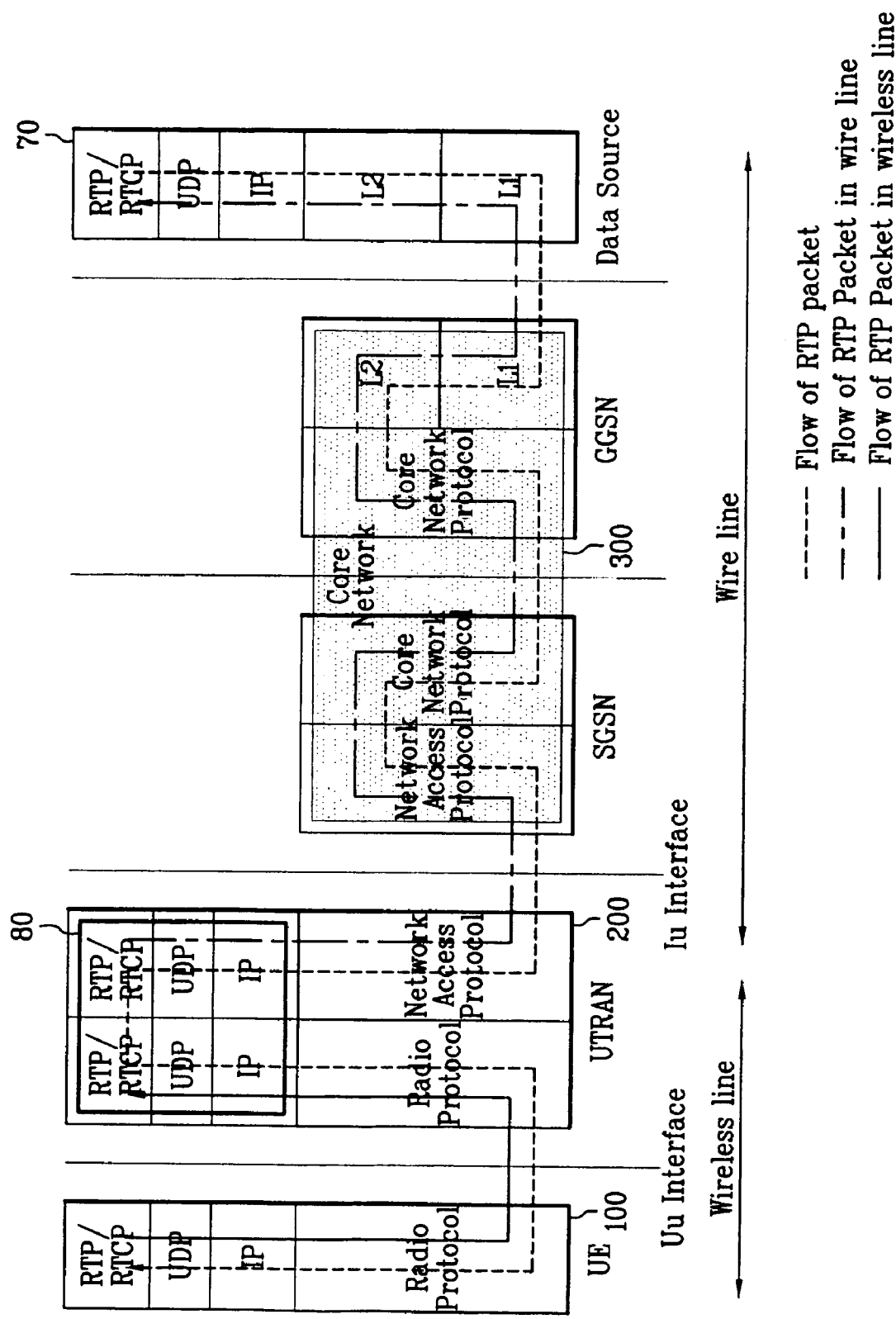
FIG. 4 is a diagram of protocol architecture for explaining real-time/non-real-time packet flow according to one embodiment of the present invention.

In one embodiment, the UTRAN 200 comprises the RTP/RTCP layers over UDP/IP layer performing operations, which act to minimize the structural alteration of the UTRAN 200. For example, the UTRAN 200 of the present invention comprises a relay function module for performing translation of RTP packet and producing RTCP packets based on the packet loss over the wired section. A relay function module is installed in RNC as an element of the UTRAN 200, in accordance with one embodiment. The relay function module distinguishes the packet loss in the wired section and radio section from each other. An example of using the relay function module according to the present invention is shown in FIG. 3. An exemplary protocol architecture for implementing the relay function module is shown in FIG. 4.

Referring to FIG. 3, a plurality of relay function modules 80*a* to 80*n* provides independent operations of RTP/RTCP in each of wired and radio sections for real-time packets, such as RTP packets. In this case, the radio section corresponds to the air interface between UTRAN 200 and UE 100 and the wired section corresponds to the non-air interface between the UTRAN 200 and a data source 70.

In one embodiment, the relay function modules 80*a* to 80*n* are used in a system for transmitting RTP and RTCP packets for MBMS. In such a system, the relay function modules 80*a* to 80*n* generate RTCP packets carrying control information regarding the packet loss over the wired section, transmit the RTCP packets to the data source, and transmit the RTP packets to the UEs 100 over the radio section.

The relay function modules 80*a* to 80*n* are installed, for example, in the UTRAN 200 performing the control of packet transmission. The relay function modules 80*a* to 80*n* are connected to RNCs 12*a* to 12*n* of the UTRAN 200, in a preferred embodiment. In implementing the system, the relay function modules 80a to 80n can be installed in the RNCs 12a to 12n, respectively, or installed in the UTRAN 200 to be separated from the RNCs 12a to 12n.

Once the relay function modules 80a to 80n are connected to the RNCs 12a to 12n, respectively, connection is achieved by 'tunneling'. That is, the relay function modules 80a to 80n are connected to the RNCs 12a to 12n, respectively by way of tunneling to perform flow and handling controls of packets over the radio section and wired section.

In one embodiment, if the relay function modules 80a to 80n are used as one element of the UTRAN 200, protocol layers executed by the relay function modules 80a to 80n provide an efficient operation of packet transmission of each section, as shown in FIG. 3.

Referring to FIG. 4, RTP/RTCP layer, a user datagram protocol (UDP) layer, and Internet protocol (IP) layers corresponding to functions of the relay function modules 80a to 80n are further provided above radio and network access protocols of the UTRAN 200. Operations of the relay function modules 80a to 80n are explained in the following by taking a case of installing the relay function modules 80a to 80n in the RNCs 12a to 12n of the UTRAN 200, respectively as an example.

In one embodiment, the relay function modules 80a to 80n generate control packets carrying packet loss information over the wired section when the data packet having real-time attributes as RTP packets transmitted from the data source 70 are received. The relay function modules 80a to 80n transmit the received data packet to the mobile device and then provide the generated control packets as RTCP packets to the data source 70.

Consequently, the data source performs the control of the data packet transmission based on the packet loss information over wired section. The relay function modules 80a to 80n broadcast and/or multicast the data packets of the real-time attribute to a plurality of UEs through a downlink channel.

In one embodiment, the relay function modules 80a to 80n receive control packets generated from the UEs having packet loss information over the current radio section. The relay function modules 80a to 80n or RNCs 12a to 12n perform the control of data packet transmission based on the packet loss information received from the UEs.

In one embodiment, the relay function modules 80a to 80n transmit the control packets combining the packet loss information from the UEs and the packet loss information generated in the relay function to the data source. The data source performs the control of data packet transmission based on the received packet loss information over radio section and the packet loss information generated from the relay function modules 80a to 80n over the wired section.

In one embodiment, when the packets transmitted to the UE 100 from the data source 70 have real-time characteristics and the packets are transmitted over a real-time communication protocol, the relay function modules 80a to 80n are configured during the RAB establishment. Accordingly, the core network 300 determines the characteristics of the data packet that will be transmitted from the data source 70 and uses a specific indicator to configure the relay function modules 80a to 80n, if the characteristic of the determined data packet is real-time and the control packet transmission is determined to use.

Thus, the present invention, in one embodiment, uses an indicator so that the use of the relay function modules 80a to 80n supporting the control of the real-time packet transmission in the system for real-time packet. In another embodiment, the present invention uses the indicator so that the use of the relay function modules 80a to 80n does not interrupt the transmission of the non real-time packet, and the real-time packet when the control packet, and particularly, RTCP packet are not used.

The core network 300 determines whether the characteristics of the current data packet that will be transmitted from the data source 70 is real-time or non-real-time. The core network 300 informs the UTRAN 200 (i.e., the termination point of the wired section) of the determined attribute of the data packet, when a radio access bearer for the packet transmission to the UE is established. A packet service system according to the present invention is implemented through the exemplary protocol architecture shown in FIG. 4 and is applicable to the service of transmitting real-time data such as MBMS.

Referring to FIG. 4, RTP is a protocol appropriate for providing a user with multimedia data (video and/or audio) having a real-time attribute using a multicast or unicast network. A packet format defined by RTP comprises an RTP media type field for expressing an RTP media type and further includes a payload containing the substantially serviced user information. The RTP media type field is for informing a type of the payload.

RTCP is a protocol for monitoring data transmission in the multicast network and performing minimal control and identification functions. Major functions of RTCP are to generate status information for distributing data to network elements belonging to the multicast network and to feed back the status information to a data source, for example.

Some functions of the RTCP are related to a flow control and a congestion control of other protocols. For example, the status information feedback through the RTCP contains the information (e.g., information of an RTP packet loss amount, delay time occurring during packet transmission, etc.) of a transmission process of the RTP packet from an originating place transmitted the RTP packet to a destination receiving the RTP packet. The RTCP packet can carry the reception status information.

Once the RTCP packet for the received RTP packet is fed back to the originating place from the destination, the originating place determines data size and/or data amount and/or data coding scheme of an RTP packet that will be transmitted, using the status information included in the RTCP packet. For example, in one embodiment of the present invention, UTRAN 200 transfers the RTCP packet carrying the status information for the received RTP packet over the wired section to the data source and deliver the received RTP packet to a user equipment (UE).

In another embodiment, the UE transmits the RTCP packet carrying the status information for the receive RTP packet over the radio section to the UTRAN 200. The RTCP packet is the control packet containing status information enabling the RTP packet transmitter to perform the control of the transmission of a data packet (RTP packet). The UTRAN 200 determines the data size and/or data amount and/or data encoding scheme of an RTP packet that will be transmitted to the UE using the status information included in the RTCP packet received from the UE.

In another embodiment, the UTRAN 200 transfers the RTCP packet carrying the combined status information included in the RTCP packet over the radio section and the wired section to the data source. The data source determines the data size and/or data rate and/or encoding scheme of an RTP packet that will be transmitted to the mobile device using the status information.

In one embodiment of the present invention, an indicator is used for indicating whether to use the relay function module in UTRAN 200. The indicator is generated from a core network 300 monitoring an attribute of a packet generated from the data source. The core network 300 generates the indicator when a radio access bearer for a packet service originated from the data source is set up. The indicator represents the attribute of the packet generated from the data source, and indicates to the UTRAN 200 whether to configure the relay function module or not.

The UTRAN 200, in one embodiment comprises, RTP and RTCP layers over the UDP/IP layer for transmission of real-time packets. The relay function module is preferably configured based on the indication received from the core network 300. The core network 300 executes control operations of the relay function module using the indicator. For example, the indicator generated by the core network 300 is a command for turning on/off the operations of the relay function module.

Referring to FIG. 3, the data source 70 enables to transfer a packet of the real-time or non-real-time attribute. The data source 70 is a server or terminal 100 offering specific data as a packet format. The core network 300 detects the attribute of the packet received from the data source 70 and then informs the UTRAN 200 as a termination of the wired section of the detected attribute of the packet to be transmitted.

When a radio access bearer for the packet transmission between the core network 300 and the UE 100 is set up, each of the SGSNs 40a to 40n of the core network 300 informs the UTRAN 200 70 whether the packet to be transmitted from the data source 70 has the non-real-time or real-time attribute. The SGSNs 40a to 40n of the core network 300 use an indicator to inform the attribute of the packet to be transmitted from the data source 70.

In one embodiment of the present invention, the indicator is not limited to inform the attribute of the current packet. The SGSNs 40a to 40n of the core network 300 utilizes the indicator in informing whether to use RTP/RTCP and/or the relay function modules 80a to 80n included in the UTRAN 200 as well as the attribute of the packet to be transmitted. In case that the indicator assigns the attribute of the packet to be transmitted, the UTRAN 200 determines whether to use the relay function modules 80a to 80n based on the assigned attribute of the packet.

The indicator informs the UTRAN 200 of whether to use the relay function modules 80a to 80n. The UTRAN 200 can check whether the packet has the real-time or non-real-time attribute from the indication from the core network 300, for example. In one embodiment of the present invention, the UTRAN 200 comprises the wired section device for receiving a packet from the data source 70. The control of packet transmission in the wired section is supported according to the reception status information of the wired section. The radio section device transmits the packet to the UE 100 to perform the control of packet transmission in the radio section according to the reception status information of the radio section.

Preferably, the UTRAN 200 of the present invention comprises the relay function modules 80a to 80n. In one embodiment, the relay function modules 80a to 80n are installed in the RNCs 12a to 12n, respectively as shown in FIG. 3. Accordingly, the UTRAN 200 turns on/off operations of the relay function modules 80a to 80n according to the command of the indicator received from the corresponding one of the SGSN 40a to 40n of the core network 300, when the radio access bearer is setup.

Once a packet is transmitted from the data source 70, each of the GGSN 50a to 50n acts as a gateway for interacting with the network to which the data source belongs to deliver the corresponding packet to the SGSNs 40a to 40n. Each of the SGSNs 40a to 40n determines the attribute of the packet to be transmitted to the UE 100 and then indicates whether to configure the relay function module based on the attribute of the corresponding packet to the UTRAN 200.

The relay function modules 80a to 80n of the UTRAN 200 operate if the packet to be delivered to the UE 100 is real-time and when the RTCP is used. If non-real-time, they do not operate and the packet is transparently transmitted from the data source to the UE. If the RTCP is not used even though the packet to be delivered is real-time, the relay function modules 80a to 80n do not operate and the packet is transparently transmitted from the data source to the UE. The operation of the relay function modules 80a to 80n is configured by the indication from the corresponding one of the SGSNs 40a to 40n.

In one embodiment, when the RTP packet is transmitted from the data source 70 to the UE 100 as a final destination, the data source 70 is able to monitor the network status for loss in the RTP packet, during the packet transmission via the UTRAN 200 positioned in the middle of the wired and radio sections. In one embodiment, the relay function modules 80a to 80n feed back the RTCP packet containing the reception status information of the wired section to the data source 70.

The RNCs 12a to 12n equipped with the relay function modules 80a to 80n, respectively transmit the packet received from the corresponding one of the SGSNs 40a to 40n to the UE over the radio section. In this case, if the service is the multicast service, the RNCs 12a to 12n transmit the packet to a plurality of UEs located in their service domain.

The relay function modules 80a to 80n feed back control packets (e.g., RTCP packets) containing the reception status information of the real-time packet over the wired section to the data source 70 and receive control packets (e.g., RTCP packet) containing the reception status information of the radio section from the UEs, respectively.

In one embodiment, each status information of the control packets received from the UEs is included in the corresponding one of the control packets to be fed back to the data source 70. The relay function modules 80a to 80n installed in the RNCs 12a to 12n, respectively provide the data source 70 with the reception status information of the UEs from the control packets received from the UEs.

In another embodiment, it is preferable for each control packet fed back to the data source 70 not to contain the reception status information of the radio section. The control packets (RTCP packets received from the UEs) containing the reception status information of the radio section are handled by the RNCs 12a to 12n, respectively. The RNCs 12a to 12n determine sizes and/or amounts and/or coding schemes of packets to be transmitted to the wireless line based on the control packets received from the UEs, respectively.

In other embodiment, each control packet generated from the RNCs 12a to 12n is fed back to the data source 70 for the data source to determine sizes and/or amounts and/or coding schemes of packets to be transmitted. But the UEs that received the data packets from the RNCs 12a to 12n do not transmit the each status information of control packets (RTCP packets) to the RNCs 12a to 12n.

In the foregoing description, it is explained that the relay function modules 80a to 80n used in discerning statuses of the wired and radio sections in the flow of the real-time/ non-real-time packets are installed in the RNCs 12a to 12n, respectively. Yet, the relay function modules 80a to 80n can be independently installed in the UTRAN 200 from the RNCs 12a to 12n. Furthermore, the RNCs 12a to 12n can be implemented to perform functions including the function of the relay function modules 80a to 80n. In an exemplary embodiment, the relay function modules 80a to 80n are installed at the RNCs 12a to 12n, respectively. Examples of transferring the indication to the UTRAN 200 to indicate whether to configure the relay function module or not in the present invention are explained as follows.

When a packet is to be transmitted from the data source 70, the core network 300 detects the attribute of the packet to be transmitted to the UTRAN 200. Then, the relay function modules 80a to 80n are configured according to an indication based on the attribute of the packets during radio access bearer establishment. Such an indication indicates whether a packet has a real-time or non-real-time attribute and whether real-time control protocol, such as RTCP, is used.

Hence, if the real-time packet is received after the indication informing the packet transmission of the real-time attribute and use of RTCP (i.e., based on information received from the core network 300), the relay function modules 80a to 80n are configured to be used, and inform the data source 70 of the status information for the real-time packet over the wired section. Yet, if the indication informing the packet transmission of the non-real-time attribute is received from the core network 300, the relay function modules 80a to 80n are not configured to use in the non-real-time packet transmission. And if the indication informing the packet transmission of the real-time attribute and the using of RTCP packet is not received from the core network 300, the relay function modules 80a to 80n are not configured to use in the real-time packet transmission at all.

The relay function modules 80a to 80n are not configured for use by the indication, if the attribute of the packet to be transmitted is non-real-time or if a real-time transmission protocol, such as RTCP, is not used despite of real-time packet transmission. Hence, the relay function modules 80a to 80n are not configured for non-real-time packet transmission or real-time packet transmission without RTCP usage.

Figure 5:
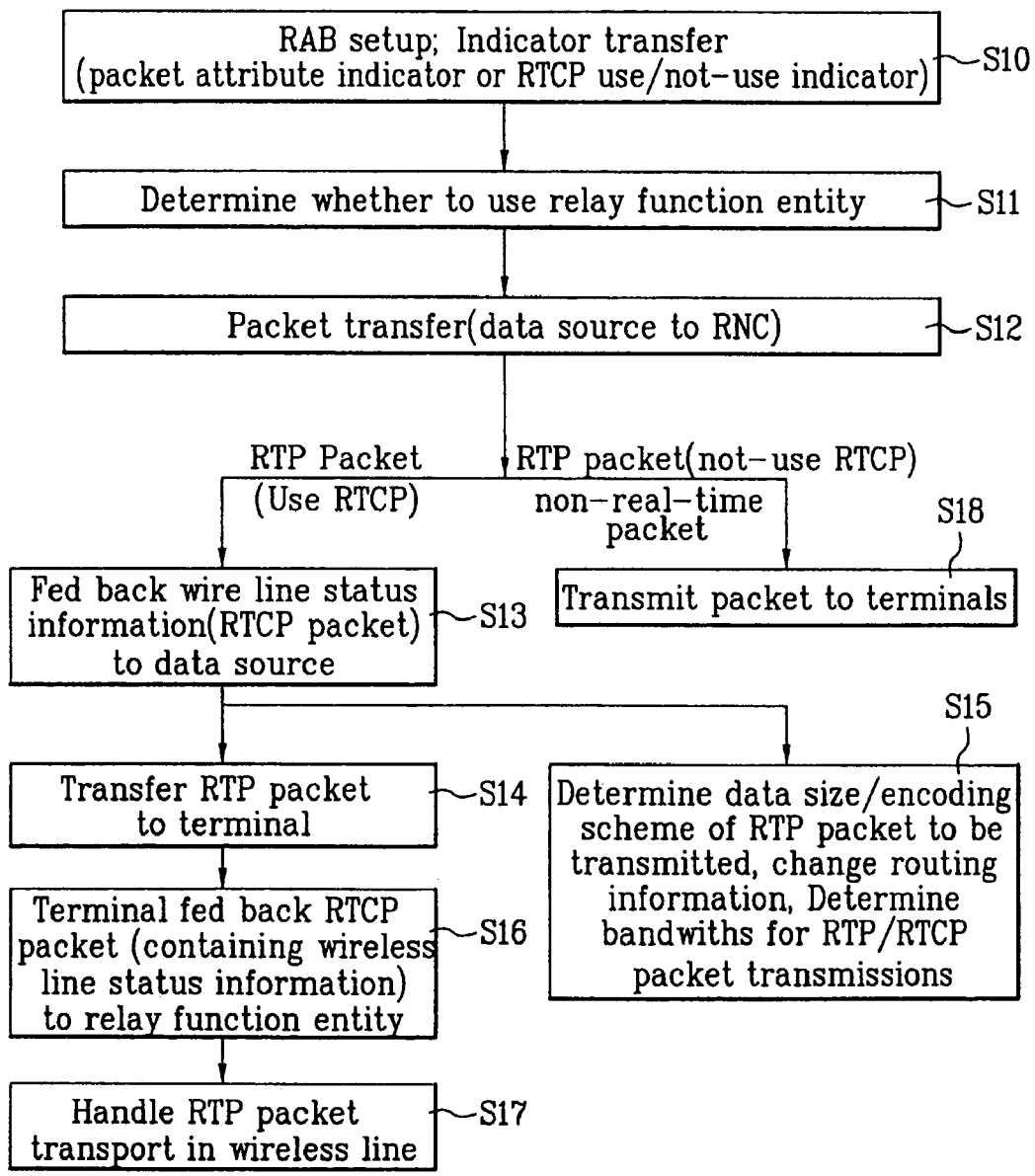
FIG. 5 is a flowchart of a procedure of handling real-time/non-real-time packets according to one embodiment of the present invention.

Referring to FIG. 5, the data source 70 can transfer a real-time packet requesting status information for real-time packet transmission, a real-time packet not requesting status information for real-time packet transmission, or non-real-time packet. In the following description, the usage of relay function module in connection with MBMS service will be described. When one specific packet transmission is determined for transmission from the data source 70, the core network 300 sets up a radio access bearer for the MBMS. That is, MBMS establishes a radio access bearer with at least one terminal 100 (S10).

In one embodiment, the MBMS radio access bearer is set up, when the core network 300 detects the attribute of packet data to be transmitted from the data source 70 and informs the UTRAN 200 of the determined attribute using the indication. As such, the SGSNs 40a to 40n of the core network 300 200 inform the UTRAN 200 70 whether to configure the relay function module or not.

In one embodiment, the indication provides information whether the packet to be transmitted has a non-real-time or real-time attribute. Moreover, the indication provides whether to use the RTCP for the control of real-time packet transmission. Accordingly, the UTRAN 200 configures the relay function modules 80a to 80n based on the received indication (S11). Subsequently, the packet is transferred to the RNCs 12a to 12n of the UTRAN 200 (S12) from the data source 70. The RNCs 12a to 12n of the UTRAN 200 decide whether to use the relay function modules 80a to 80n by the indication received from the core network 300 in the process of setting up the radio access bearer. Therefore, the relay function modules 80a to 80n operate as provided below.

In one embodiment, the relay function module receives the RTP packet from the data source, detects the amount of lost packet during packet transmission over wired section, generates the RTCP packet carrying the status information based on the detection, and delivers the RTCP packet to the data source. The relay function module transmits the received RTP packet to the terminal 100s over the radio section. In another embodiment, if real time data is not being transmitted, or if a real-time communication protocol is not used, the relay function module is configured to transparently transmit the RTP packet to the terminal 100 from the data source.

In one embodiment, the terminal 100 receives the RTP packets from the relay function module and detects the amount of lost packet during packet transmission over radio section, generates the RTCP packet carrying the status information based on the detection, and delivers the RTCP packet to the relay function module. The relay function module receives the RTCP packet from the terminal 100 and determines the next RTP packet transmission rate, size or encoding scheme.

In one embodiment, the relay function module receives the RTCP packet from the terminal 100, generates the RTCP packet to be delivered to the data source 70 using both status information of wired section and status information of radio section, and delivers the RTCP packet to the data source. Then, the data source 70 regards the RTCP packets received from the relay function modules 80a to 80n as including the status information of wired section and radio section, and appropriately determines the next RTP packet transmission rate, size or encoding scheme.

When a packet to be received is an RTP packet without use of RTCP or a non-real-time packet, i.e. in case that the relay function module 80 is unnecessary for use, the RNCs 12a to 12n transparently transmit the packet received via the core network 300 to a plurality of the terminal 100s 100 over the radio section (S18) not passing the relay function module.

Accordingly, in the description of the present invention, UTRAN 200 including the relay function module delivers the RTCP packet to the data source from a termination of wired section to preferably perform RTP and RTCP operations. Specifically, RTCP packet from each user equipment can be handled so as not to be delivered to the relay function module to prevent the waste of radio resources.

In the present invention, since RTCP packets for controlling RTP packets are generated from the UTRAN 200 at the end point of the wired section, the RTCP packets can be used to determine the status of the wired section. Therefore, the present invention is configured to control the RTP packets to be transmitted based on the more exact status information discerning the wired section and radio section.

For instance, the data source appropriately changes the rate, the size and encoding scheme of the RTP packet to be transmitted to reduce the loss of the RTP packet and to adjust the communications status between the wired section and the radio section. Moreover, the error loss in the wired line is accurately determined to efficiently control the wired line.

In the present invention, the data source manages and controls the real-time packet transmission adjusting the data rate, size, and encoding scheme based on the control information of the wired section to be appropriate for the status of the wired section. In the present invention, UTRAN 200 manages and controls the real-time packet transmission itself adjusting the data rate, size and encoding scheme to be appropriate based on the control information of the radio section for the status of the radio section. In the present invention, statuses of the wired and radio sections are considered separately from each other, whereby it is able to accurately judge whether the loss of the real-time data packets takes place in the wired or radio section as well as to accurately judge the respective condition of packet transmission in the wired and radio sections.

In the present invention, bandwidths for RTP and RTCP can be accurately determined, and the packet transmission is more effectively controlled over the whole network by grasping the status of the wired section. The system according to the present invention is modified to be appropriate for the invention. This system is also applicable to MBMS using RTP and RTCP packet to transmit real-time packet and control the real-time packet. Hence, the present invention is more effective when the system broadcasts/multicasts real-time packets to user equipments for MBMS.

Finally, in the present invention, when UTRAN 200 uses the relay function module, the indication for configuration of the relay function module is further used to improve an operational efficiency of the relay function module. Therefore, the present invention is more appropriate for a packet service having real-time characteristics.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of transferring real-time data from a data source to a mobile device in communication with a communications network having a wired communication section and a radio communication section, the method comprising:
   determining whether a data packet to be received comprises at least one of real-time data and non-real-time data;
   configuring a relay function module for receiving the real-time data from the data source over the wired communication section if the data packet to be received comprises the real-time data;
   determining packet loss over the wired communication section to produce control information for adjusting transmission requirements for the real-time data if the real-time data is received and the relay function module is configured;
   transmitting the control information to the data source if the control information is produced; and
   transmitting the real-time data received from the data source to the mobile device;
   wherein the relay function module is not configured if the data packet to be received comprises the non-real-time data.

2. A method of transferring real-time data from a data source to a mobile device in communication with a communications network having a wired communication section and a radio communication section, the method comprising:
   determining whether a data packet to be received comprises at least one of real-time data and non-real-time data;
   configuring a relay function module for receiving the real-time data from the data source over the wired communication section if the data packet to be received comprises the real-time data;
   transmitting the real-time data to the mobile device if the data packet to be received comprises the real-time data and the relay function module is configured;
   receiving from the mobile device first control information based on first packet loss of the real-time data associated with the radio communication section;
   determining a second packet loss of the real-time data associated with the wired communication section;
   generating second control information for adjusting transmission requirements for the real-time data based on the first control information and the second packet loss; and
   transmitting the second control information to the data source;
   wherein the relay function module is not configured if the data packet to be received comprises the non-real-time data.

3. A method of data communication comprising:
   establishing a radio access bearer between a core network and a mobile device over a communications network comprising wired and radio communication sections;
   determining whether a packet to be received from the core network comprises at least one of real-time characteristics and non-real-time characteristics; and
   configuring a relay function module for generating control information and transmitting the packet to the mobile device, when the packet has real-time characteristics and the control information indicates that a real-time communication protocol is to be used for communication of the packet;
   wherein the relay function module is not configured if the packet to be received from the core network comprises non-real-time characteristics.

4. A method of communicating in a communication system comprising a wireless network for communicating with a mobile station and a wired network, the method comprising:
   determining whether packet data to be received from a data source element comprises at least one of real-time information and non-real-time information;
   configuring a relay function module for receiving the packet data from the data source element over at least part of the wired network if the packet data to be received comprises the real-time information;
   receiving in the radio access network, the packet data associated with the real-time information from the data source element, wherein the packet data is provided to the radio access network using a transmission protocol over the at least part of the wired network;
   determining in the relay function module a first control signal associated with data loss of the packet data received from the data source element, wherein the data loss occurred in the wired network; and transmitting the first control signal from the relay function module to the data source element to indicate the data loss of the packet data corresponding to using the transmission protocol over the at least part of the wired network;

wherein the relay function module is not configured if the packet data to be received comprises the non-real-time information.

5. The method of claim 4, further comprising:
transmitting the packet data to the mobile station by the radio access network.

6. The method of claim 5, further comprising:
receiving in the radio access network a second control signal associated with data loss of the packet data over the wireless network transmitted to the mobile station.

7. The method of claim 6, further comprising:
transmitting the second control signal from the radio access network to the data source element to indicate the data loss of the packet data over the wireless network.

8. The method of claim 6, wherein the radio access network processes the first and second control signals to form a processed control signal and transmits the processed control signal to the data source element, wherein the processed control signal indicates the respective data loss for the packet data in each of the wireless and the wired networks.

9. The method of claim 4, wherein the relay function module of the radio access network is engaged when setting a radio access bearer between the radio access network and the mobile station.

10. The method of claim 9, wherein the radio access bearer comprises communication between the mobile station and a core network.

11. The method of claim 4, wherein the radio access network transmits the packet data to a plurality of mobile stations over the wireless network.

12. The method of claim 11, wherein the radio access network receives a plurality of control signals from the plurality of mobile stations, wherein the plurality of control signals are associated with quality of received packet data by each of the plurality of mobile stations.

13. The method of claim 12, wherein the radio access network processes the plurality of control signals to produce a processed control signal and transmits the processed control signal to the data source element to indicate the data loss of the packet data in the wireless network.

14. The method of claim 4, further comprising:
adjusting the transmission protocol in response to the first control signal.

15. The method of claim 14, wherein the transmission protocol comprises at least one of transmission packet data size and encoding scheme for the real-time information.

16. A system for communicating real-time information between a mobile station and a wired network, wherein the mobile station communicates with the wired network over a wireless network, the system comprising:

a radio access network for receiving packet data associated with real-time information from a data source element, wherein the packet data is provided to the radio access network using a transmission protocol over at least part of the wired network; and a relay function module for determining a first control signal associated with data loss of the packet data received from the data source element, wherein the data loss occurred in the wired network, and for transmitting the first control signal to the data source element to indicate the data loss of the packet data corresponding to using the transmission protocol over the at least part of the wired networks;

wherein the radio access network determines whether the packet data to be received from the data source element comprises at least one of real-time information and non-real-time information and configures the relay function module for receiving the packet data from the data source element over the at least cart of the wired network if the packet data to be received comprises the real-time information;

wherein the relay function module is not configured if the packet data to be received comprises the non-real-time information.

17. The system of claim 16, wherein the radio access network transmits the packet data to the mobile station.

18. The system of claim 17, wherein the radio access network receives a second control signal associated with data loss of the packet data over the wireless network transmitted to the mobile station.

19. The system of claim 18, wherein the radio access network transmits the second control signal to the data source element to indicate the data loss of the packet data over the wireless network.

20. The system of claim 18, wherein the radio access network processes the first and second control signals to form a processed control signal and transmits the processed control signal to the data source element, and wherein the processed control signal indicates the respective data loss for the packet data in each of the wireless and wired networks.

21. The system of claim 16, wherein the relay function module of the radio access network is engaged when setting a radio access bearer between the radio access network and the mobile station.

22. The system of claim 21, wherein the radio access bearer comprises communication between the mobile station and a core network.

23. The system of claim 16, wherein the radio access network transmits the packet data to a plurality of mobile stations over the wireless network.

24. The system of claim 16, wherein the radio access network receives a plurality of control signals from the plurality of mobile stations, wherein the plurality of control signals are associated with quality of received packet data by each of the plurality of mobile stations.

25. The system of claim 24, wherein the radio access network processes the plurality of control signals to produce a processed control signal and transmits the processed control signal to the data source element to indicate the data loss of the packet data in the wireless network.

26. The system of claim 16, further comprising:
means for adjusting the transmission protocol in response to the first control signal.

27. The system of claim 26, wherein the transmission protocol comprises at least one of transmission requirements, transmission packet data size and encoding mode.

* * * * *